United States Patent

Hubbe et al.

[11] Patent Number: 6,097,967
[45] Date of Patent: Aug. 1, 2000

[54] METHOD OF DOWNLOADING A PREDETERMINED LIST OF ITEMS INTO A MOBILE TERMINAL CONTROLLED BY A SUBSCRIBER IDENTITY MODULE, AND A COMMAND, A SUBSCRIBER IDENTITY MODULE, AND A MOBILE TERMINAL CORRESPONDING TO THE METHOD

[75] Inventors: Pascal Hubbe, Paris; Anne-Gaëlle Lelong-Gilbert, Viroflay, both of France

[73] Assignee: Alcatel, Paris, France

[21] Appl. No.: 09/131,672

[22] Filed: Aug. 10, 1998

[30] Foreign Application Priority Data

Aug. 14, 1997 [FR] France ................................ 97 10367

[51] Int. Cl.⁷ ...................................................... H04B 1/38
[52] U.S. Cl. .......................... 455/558; 455/550; 455/575; 379/357
[58] Field of Search ..................................... 455/557, 558, 455/418, 419, 422, 90, 550, 575; 379/357

[56] References Cited

U.S. PATENT DOCUMENTS

| | | | |
|---|---|---|---|
| 5,497,411 | 3/1996 | Pellerin .................................... | 455/558 |
| 5,687,216 | 11/1997 | Svensson ................................ | 455/558 |
| 5,875,404 | 2/1999 | Messiet ................................... | 455/558 |
| 5,884,168 | 3/1999 | Kolev et al. ............................ | 455/558 |
| 5,887,266 | 3/1999 | Heinonen et al. ...................... | 455/558 |

FOREIGN PATENT DOCUMENTS

0555992A1  8/1993  European Pat. Off. .
0689368A1  12/1995  European Pat. Off. .

*Primary Examiner*—Dwayne D. Bost
*Assistant Examiner*—Quochien B. Vuong
*Attorney, Agent, or Firm*—Sughrue, Mion, Zinn, Macpeak & Seas, PLLC

[57] ABSTRACT

The invention relates to an improved method of downloading a predetermined list of items into a mobile terminal controlled by a subscriber identity module, in which method:

the subscriber identity module transmits a downloading command to the terminal to download items from said list; and the terminal receives said downloading command and executes it.

The items from said list are distributed in a set of at least one downloading command organized to be transmitted successively. Each downloading command contains an end-of-downloading mark that takes either a first value or a second value depending on whether or not said downloading command is the only or last command in said set of commands.

9 Claims, 2 Drawing Sheets

METHOD OF DOWNLOADING A PREDETERMINED LIST OF ITEMS INTO A MOBILE TERMINAL CONTROLLED BY A SUBSCRIBER IDENTITY MODULE, AND A COMMAND, A SUBSCRIBER IDENTITY MODULE, AND A MOBILE TERMINAL CORRESPONDING TO THE METHOD

The present invention relates to radiocommunications systems and particularly, but not exclusively, to systems such as-the Global System for Mobile communications (GSM), and the Digital Cellular System (DCS) 1800.

BACKGROUND OF THE INVENTION

In general, in such a system, the user has a mobile station constituted by a mobile terminal which co-operates with a subscriber identity module (referred to as a "SIM card" in the GSM Standard). Generally, the SIM card is a smart card designed to be inserted into a mobile terminal to enable said terminal to be used.

More precisely, the invention relates to an improved method enabling a predetermined list of items to be downloaded into a mobile terminal controlled by a subscriber identity module.

Conventionally, a pair comprising a terminal and a subscriber identity module offers various facilities specific to the subscriber, to the network and to security. Such facilities are, for example:

- the possibility of storing abbreviated numbers (telephone directories);
- the possibility of storing short messages;
- the possibility of storing the identities of preferred network operators;
- the possibility of obtaining consumption information (prepaid cards);
- the possibility of storing a fixed list of telephone numbers (subscriber restricted to making calls to numbers in the list stored in the subscriber identity module);
- the possibility of storing roving management information (location of the subscriber in the GSM network);
- the possibility of storing the international mobile subscriber identity number (in compliance with the IMSI-TMSI Standards);
- the possibility of storing data characteristic of the cell (such as BCCH information);
- the possibility of authenticating the subscriber with the network; and
- the possibility of authenticating the subscriber passively by means of a CHV1 secret code.

However, a major drawback remains. The subscriber identity module cannot directly influence the behavior of the mobile terminal of the user by managing presentation of new services to the user.

To mitigate that drawback, GSM Recommendation 11.14 phase $2^+$ defines the ground rules for implementing a toolkit in the subscriber identity module, and for enabling operators to create their own specific applications independently of the mobile terminal used, provided that said terminal is compatible with GSM Recommendation 11.14 phase $2^+$.

Furthermore, to make it possible to dialog with and to use the toolkit, GSM Recommendation 11.11 phase $2^+$ specifies the mechanisms that make the two portions (the mobile terminal and the subscriber identity module) interoperable.

In other words, the subscriber identity module has commands available that it can have executed by the terminal.

Conventionally, certain commands, and in particular the "SET UP MENU" and "SELECT ITEM" commands in the GSM Standard, are used to transmit a list of items to the terminal. Such commands are referred to below as "downloading commands". Currently, to transmit any one list of items, the subscriber identity module can only send a single downloading command, and sending a new downloading command replaces the previously transmitted items accordingly.

Unfortunately, any one downloading command can transmit only a limited number of bytes (256 at the most in GSM), which is the equivalent of an average list of about 18 items (because the items are of various sizes).

It is easy to understand that such a limitation on the number of items that can be downloaded into the terminal constitutes a limitation on the added-value services that can be offered by the pair comprising the terminal and the subscriber identity module. This is particularly frustrating since subscriber identity modules have increasingly large memories enabling them to store a very large amount of data and in particular data relating to services.

OBJECTS AND SUMMARY OF THE INVENTION

A particular object of the invention is to mitigate that major drawback of the state of the art.

More precisely, an object of the present invention is to provide a method of downloading a predetermined list of items into a mobile radiocommunications terminal controlled by a subscriber identity module, which method makes it possible to overcome any limitation on the number of items to be downloaded.

Another object of the invention is to provide a command, a subscriber identity module, and a mobile terminal that enable such a method to be implemented.

An additional object of the invention is to provide such a method, such a command, such a subscriber identity module, and such a mobile terminal that make it possible to optimize the use of the resources available at the subscriber identity module and mobile terminal used.

Another additional object of the invention is to provide such a method, such a command, such a subscriber identity module, and such a mobile terminal that make it possible to ignore the differences in the types of mobile terminals used.

These objects and others that appear below are achieved by the invention by means of an improved method of downloading a predetermined list of items into a mobile terminal controlled by a subscriber identity module. The method is of the type comprising the following steps:

- the subscriber identity module transmits a downloading command to the terminal to download items from said list; and
- the terminal receives said downloading command and executes it.

In this method, the items from said list are distributed in a set of commands comprising at least one downloading command, and, when said set of commands comprises at least two downloading commands, said commands are organized to be transmitted successively.

In this method, each downloading command contains an end-of-downloading mark that takes either a first value or a second value depending on whether or not said downloading command is the only or last command in said set of commands.

The invention thus constitutes an improvement over currently-used downloading commands. The general at principle of the invention is based on adding an end-of-downloading mark to each downloading command so as to tell the mobile terminal whether it should expect to receive one or more other downloading commands for downloading items from the list in question.

With its end-of-downloading mark, this downloading command makes it possible to make best use of the capabilities of the terminal and of the subscriber identity module that are used. The corresponding memories are of large enough size. In addition, it makes it possible for the subscriber identity module to download any number of items into the terminal. In other words, the current limit of 256 bytes (i.e. 18 items on average) is overcome.

Clearly, the downloading command of the invention may relate to downloading various types of item. The term "item" is used herein to mean any type of information and/or data or a combination of one or more types of information and/or data to be downloaded into the terminal. For example, such items may be telephone and/or facsimile numbers and/or man-machine interface systems, etc.

Clearly, the subscriber identity module can send various sets of item downloading commands successively so as to download various lists of items.

It should be noted that the invention does not put any constraint on the number, the kind, or the type of the item(s) to be downloaded. Likewise, the invention does not put any constraint on the type of the end-of-downloading mark.

In a preferred implementation of the invention, said method further comprises a step in which said terminal transmits a message to said subscriber identity module to confirm that each downloading command from said set of commands has been taken into account.

Thus, the terminal informs the subscriber identity module of what becomes of each downloading command sent to the terminal by the subscriber identity module. The message is particularly useful when the terminal cannot execute each downloading command after it has received the command (e.g. because command processing is in progress and/or takes priority). Furthermore, the message indicates that the terminal is ready to execute another command, in particular another downloading command from the same set of commands (so as to add a number of items to be downloaded to the list of items already created in the terminal).

Advantageously, during a prior step, said terminal informs said subscriber identity module whether it is capable of executing a downloading command of the type containing an end-of-downloading mark.

Thus, the subscriber identity module avoids sending unnecessarily a downloading command with an end-of-downloading mark if the mobile terminal does not know how to recognize and manage such a mark. For example, the prior step may correspond to an initialization step or to a step performed at any other time, in particular when the subscriber identity module needs to send a set of one or more item downloading commands. In this way, the subscriber identity module knows whether it can send the downloading command of the type containing an end-of-downloading mark to the terminal.

The invention further provides a downloading command of the type designed to be used on downloading a predetermined list of items into a mobile terminal controlled by a subscriber identity module, said command being transmitted by the subscriber identity module to the terminal so that the terminal executes it. Said command contains an end-of-downloading mark that takes either a first value or a second value depending on whether or not said downloading command is the only or last command in a set of at least one downloading command in which the items from said predetermined list of items are distributed. When said set of commands comprises at least two downloading commands, said commands are organized to be transmitted successively.

Advantageously, said command belongs to a group of commands in the protocol for dialog between said terminal and said subscriber identity module.

The invention further provides a subscriber identity module of the type designed to control a mobile radiocommunications terminal with which it co-operates. Said subscriber identity module includes transmit means for transmitting to said terminal a set of commands comprising at least one downloading command in which items from said predetermined list of items are distributed. When said set of commands comprises at least two downloading commands, said commands are organized to be transmitted successively. Each downloading command contains an end-of-downloading mark that takes either a first value or a second value depending on whether or not said downloading command is the only or last command in said set of commands, execution of said downloading command by said terminal making it possible, as a function of the value of said end-of-downloading mark, for said terminal to know whether or not all the items in said list have been transmitted.

The additional means of the subscriber identity module are simple to implement, low-cost, and do not require any major restructuring compared with known subscriber identity modules.

Advantageously, said subscriber identity module includes at least some of the means belonging to the group comprising:

means for temporarily storing a downloading command of the type containing an end-of-downloading mark; and means for receiving a message confirming that each downloading command in said set of commands has been taken into account.

Clearly, the subscriber identity module of the invention may be provided with a library containing all of the types of downloading command (for various types of item suitable for being downloaded) that can be used by various terminals. In this way, by suitably marking the type of item that the mobile terminal uses, the subscriber identity module makes sure that it does not send downloading commands that the terminal cannot execute or that it does not need.

The invention further provides a mobile radiocommunications terminal of the type designed to be controlled by a subscriber identity module with which it co-operates.

Said terminal includes:

receive means for receiving a set of commands comprising at least one downloading command in which items from said predetermined list of items are distributed; said commands being organized to be transmitted successively when said set comprises at least two downloading commands; each downloading command containing an end-of-downloading mark that takes either a first valve or a second value depending on whether or not said downloading command is the only or last command in said set of commands; and execution means for executing each downloading command in said set of commands, so that, as a function of the value of said end-of-downloading mark, said terminal knows whether or not all of the items in said list have been transmitted by said subscriber identity module.

Thus, the mobile terminal of the invention is capable of receiving, analyzing, recognizing, and executing a set of one or more downloading commands.

Clearly, the invention does not put any constraint on the time required to perform the various operations.

Likewise, the invention does not put any constraint on the need to interrupt the tasks that the terminal is executing at the time when the set of downloading commands is received.

In a preferred embodiment of the invention, said terminal further includes transmit means for transmitting a message to said subscriber identity module confirming that each downloading command from said set of commands has been taken into account.

Thus, this makes it possible to keep the subscriber identity module informed of the state of progress in the terminal of processing of each downloading command from the set of commands.

BRIEF DESCRIPTION OF THE DRAWINGS

Other characteristics and advantages of the invention appear on reading the following description of a preferred embodiment of the invention, given merely by way of non-limiting example and indication, and with reference to the accompanying drawings, in which.

MORE DETAILED DESCRIPTION

In the remainder of the description, the particular case of a radiocommunications system complying with the GSM Standard is examined. Clearly, the person skilled in the art can extend the principles mentioned below to other types of radiocommunications system.

The invention is thus based on adding a downloading mark to the item downloading command, so as to increase its capacity to download items. In other words, the present invention makes it possible to send a plurality of successive downloading commands while informing the terminal in each downloading command whether or not a new downloading command will follow.

The invention also relates to a command, to a SIM and to a terminal that enable the method to be implemented.

Figure 1:
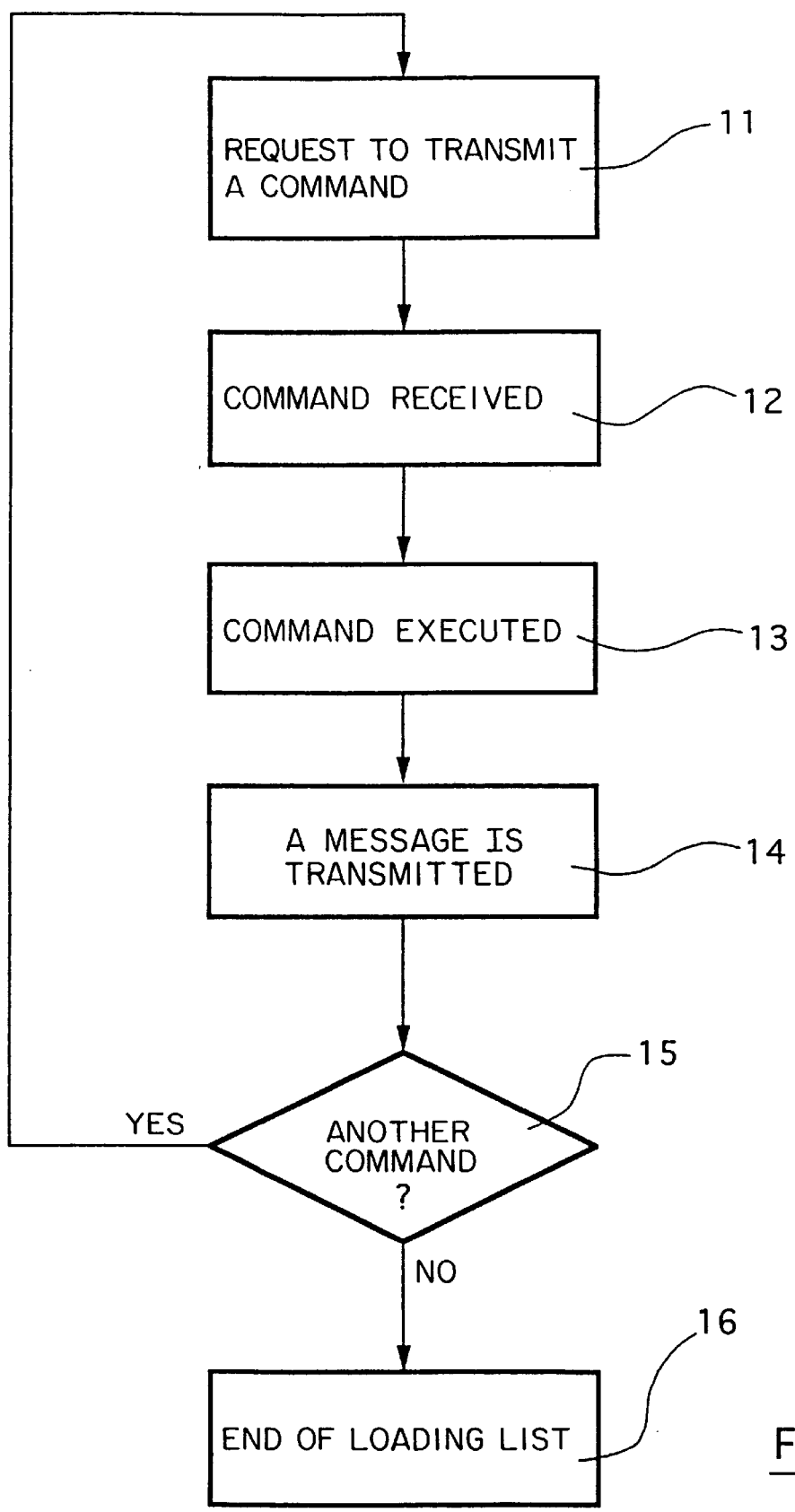
FIG. 1 is a simplified flow chart showing a particular implementation of the method of the invention.

With reference to the flow chart shown in FIG. 1, a description is given below of a particular implementation of the method of the invention for downloading a predetermined list of items into a terminal controlled by a SIM with which the terminal co-operates.

The method comprises the following successive steps:

the SIM requests to transmit (11) an item downloading command containing an end-of-downloading mark to the terminal;

the terminal retrieves (12) the item downloading command;

the terminal executes (13) the received item downloading command, the end-of-downloading mark informing the terminal whether or not the command will be followed by another downloading command;

the terminal transmits (14) a message to the SIM confirming that the received item downloading command has been taken into account, so as to inform the SIM that the terminal has executed said command;

the terminal examines (15) the value of the end-of-downloading mark to find out whether another downloading command is to be sent; and the method loops back to step (11) if the end-of-downloading mark tells the terminal that the preceding command is followed by another item downloading command containing an end-of-downloading mark, and if the SIM indicates that it wishes to transmit a command to the terminal again; otherwise, the resulting list of items (16) is complete, and the downloading of the list is thus ended.

The items belong to a list. Such items correspond, for example, to "items" in GSM terminology, or to any type of information and/or data or to a combination of different types of information and/or data.

Figure 2:
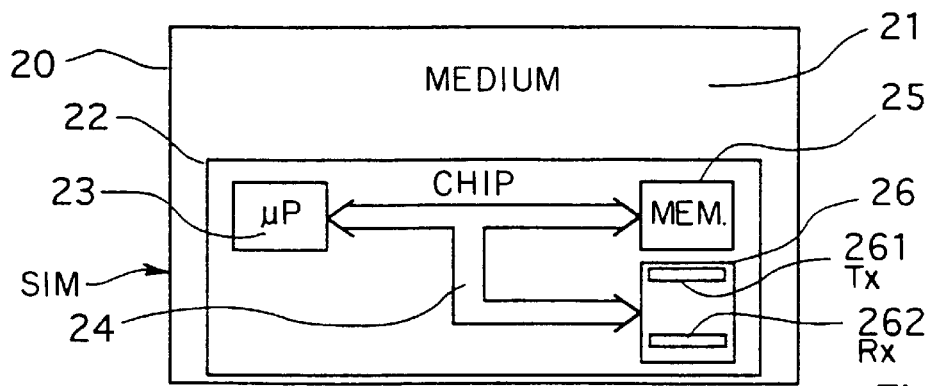
FIG. 2 is a simplified diagram showing a particular embodiment of a subscriber identity module of the invention that implements the method of FIG. 1.

With reference to the simplified diagram of FIG. 2, a description is given below of a SIM (or more generally a subscriber identity module) of the invention.

The SIM 20 is constituted in particular by a medium 21 which carries a semiconductor chip 22. The chip comprises, in particular, data processing and management means 23 (e.g. a microprocessor) constituting the central decision-taking member which controls the other means of the chip 22 (shown in part at 25 and 26) via a both-way bus 24.

Data storage means 25 on the chip 22 make it possible to store, at least temporarily, in particular an item downloading command of the type containing an end-of-downloading mark and to be transmitted to the terminal. Each downloading command is used to inform the terminal whether or not the command will be followed by another item downloading command, so as to download a list of items exhaustively.

In addition, the chip 22 includes co-operation means 26 designed to co-operate with associated co-operation means (such as a a reader 36, FIG. 3) provided on the terminal. The co-operation means 26 comprise, in particular, transmit means 261 for transmitting a set of item downloading commands to the terminal, and receive means 262 for receiving a message from the terminal confirming that each downloading command from the set of commands has been taken into account.

Each downloading command comprises items to be downloaded and an end-of-downloading mark which can take either a first value or a second value to indicate whether or not the command is the last command in the set of commands to be sent.

The message confirming that each downloading command has been taken into account informs the SIM that the terminal has indeed recorded the preceding downloading command from the set of commands, and that the terminal has executed it.

In this way, the terminal is capable of receiving another command, in particular another downloading command from the set of commands.

Figure 3:
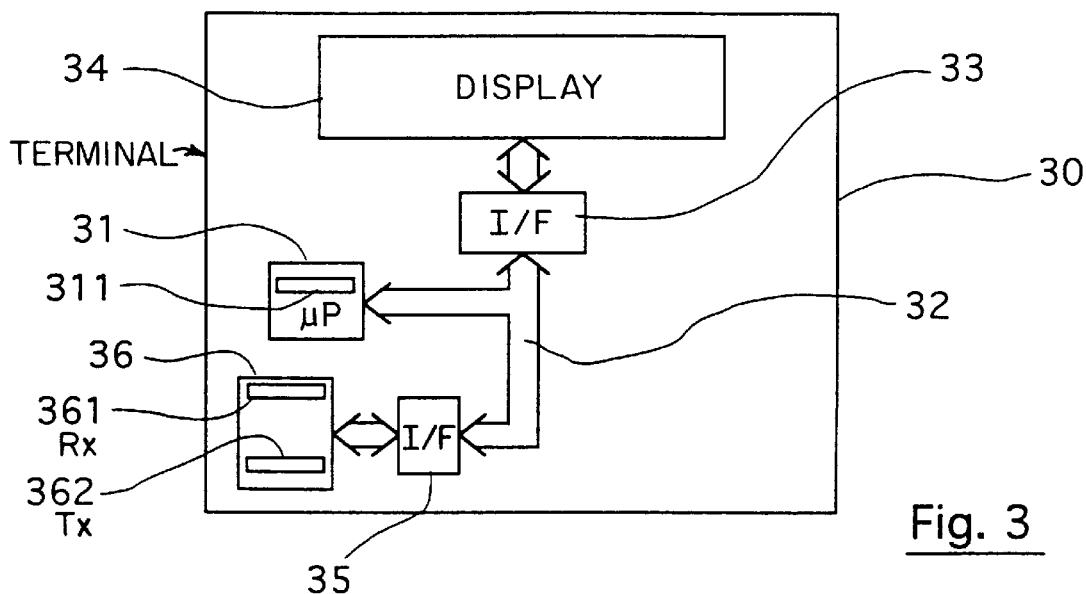
FIG. 3 is a simplified diagram of a particular embodiment of a mobile terminal of the invention designed to be controlled by the subscriber identity module of FIG. 2.

In the example shown in FIG. 3, the terminal 30 of the invention includes data processing and management means 31 (e.g. a microprocessor) constituting a central decision-taking member which controls the other means of the terminal via a both-way bus 32.

According to the invention, the data processing and management means 31 comprise in particular execution means 311 for enabling the terminal to execute each downloading command from a set of commands. The execution means 311 make it possible, in particular, to inform the terminal whether or not the preceding downloading command will be followed by another downloading command from the set of commands. Such an operation makes it possible to download a list of items exhaustively. The list of items is optionally displayed via interface means 33 on display means 34 on the terminal.

The data processing and management means 31 control, in particular, various interface means 33 and 35 providing interfaces respectively with the display means 34, and with the SIM reader 36. The SIM reader 36 comprises, in particular, receive means 361 for receiving a set of one or more downloading commands to be received successively and in which items from a predetermined list of items are distributed.

In addition, the reader 36 further comprises transmit means 362 for transmitting a message confirming that each downloading command from the set of commands has been taken into account.

In compliance with GSM Recommendations 11.11 and 11.14, a group of SIM application commands referred to as the "SIM Application Toolkit" and contained in the SIM is used. This group comprises a set of applications and of associated procedures that can be used during a GSM session. The SIM Application Toolkit presents, in particular, the way that a SIM can interact and operate with any terminal, and, for this purpose, it incorporates the specific mechanisms required by an application.

In particular, in the context of the SIM Application Toolkit, provision is made for the SIM to store, in a file referred to as the "SIM Service Table", information that indicates that it is capable of sending to the terminal commands belonging to the category referred to as "Proactive SIM" commands that the SIM can have executed by the terminal (if the terminal is adapted accordingly). After reading the SIM Service Table, and by means of a "Terminal Profile" command, the terminal informs the SIM of the list of Proactive SIM commands that the terminal is capable of executing. The Proactive SIM commands include, in particular, a SET UP MENU command for setting up a menu of items to choose from, and a SELECT ITEM command for selecting an item from a list of items.

The invention aims precisely to improve the Proactive SIM downloading commands. The invention may be implemented in particular with the SET UP MENU and SELECT ITEM commands.

It is recalled that, conventionally, once it has been put in co-operation with the terminal, the SIM attempts to find out what the terminal is capable of performing, in particular in terms of commands. For this purpose, during a prior step, a "Terminal Profile" message in a "Profile Download" procedure is sent from the terminal to the SIM. In this message, the terminal informs the SIM of the list of commands that it is capable of recognizing and of executing. Therefore, depending on circumstances, the downloading command of the invention of the type containing an end-of-downloading mark might or might not be in the list.

Figure 4:
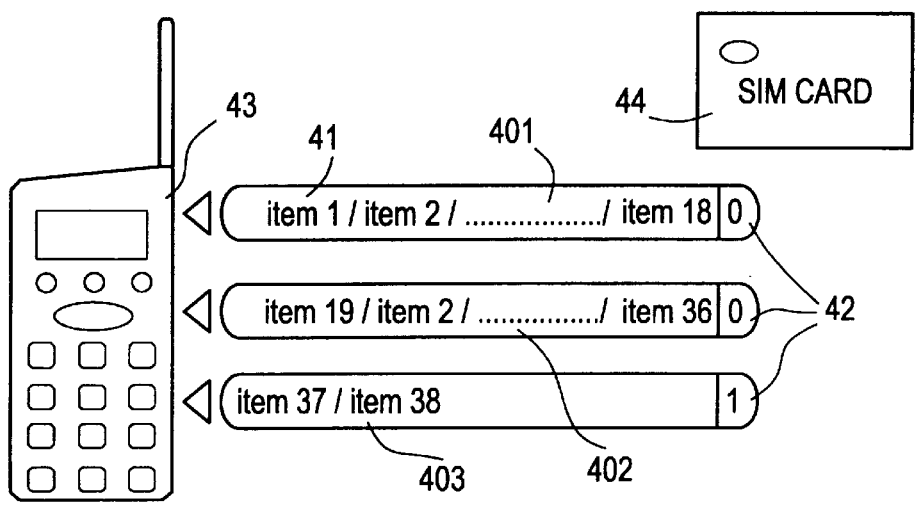
FIG. 4 is a simplified diagram showing a particular implementation of a command of the invention, as implemented by the method of FIG. 1.

In the example shown in FIG. 4, the set of commands comprises three successive downloading commands 401, 402, 403. Each downloading command 401, 402, 403 comprises in particular items 41 and an end-of-downloading mark 42. The mark may, in particular, be a flag. For example, the flag takes the value "0" if the terminal 43 should expect to receive at least one other downloading command containing further items, and it takes the value "1" to indicate that all of the items have been transmitted by the SIM 44 and that the command in progress is the last command 403.

It should be noted that, although the above description corresponds more particularly to the case when the downloading command of the invention is stored in the list of "Proactive SIM" commands in the SIM and is a SELECT ITEM or a SET UP MENU command, it is also possible to store this command in other files of the SIM and/or to apply the principle of the invention to other types of downloading command.

What is claimed is:

1. An improved method of downloading a predetermined list of items into a mobile terminal controlled by a subscriber identity module, said method being of the type comprising the following steps:

the subscriber identity module transmits a downloading command to the terminal to download items from said list; and the terminal receives said downloading command and executes it;

wherein the items from said list are distributed in a set of commands comprising at least one downloading command, and, when sais set of commands comprises at least two downloading commands, said commands are organized to be transmitted successively;

and wherein each downloading command contains an end-of-downloading mark that takes either a first value or a second value depending on whether or not said downloading command is the only or last command in said set of commands.

2. A method according to claim 1, further comprising a step in which said terminal transmits a message to said subscriber identity module to confirm that each downloading command from said set of commands has been taken into account.

3. A method according to claim 1, wherein, during a prior step, said terminal informs said subscriber identity module whether it is capable of executing a downloading command of the type containing an end-of-downloading mark.

4. A downloading command of the type designed to be used on downloading a predetermined list of items into a mobile terminal controlled by a subscriber identity module, said command being transmitted by the subscriber identity module to the terminal so that the terminal executes it;

said command containing an end-of-downloading mark that takes either a first value or a second value depending on whether or not said downloading command is the only or last command in a set of at least one downloading command in which the items from said predetermined list of items are distributed, said commands being organized to be transmitted successively when said set of commands comprises at least two downloading commands.

5. A command according to claim 4, belonging to a group of commands in the protocol for dialog between said terminal and said subscriber identity module.

6. A subscriber identity module of the type designed to control a mobile radiocommunications terminal with which it co-operates, said subscriber identity module including transmit means for transmitting to said terminal a set of commands comprising at least one downloading command in which items from said predetermined list of items are distributed, said commands being organized to be transmitted successively when said set of commands comprises at least two downloading commands;

each downloading command containing an end-of-downloading mark that takes either a first value or a second value depending on whether or not said downloading command is the only or last command in said set of commands, execution of said downloading command by said terminal making it possible, as a function of the value of said end-of-downloading mark, for said terminal to know whether all the items in said list have been transmitted.

7. A subscriber identity module according to claim 6, including at least some of the means belonging to the group comprising:

means for temporarily storing a downloading command of the type containing an end-of-downloading mark; and means for receiving a message confirming that each downloading command in said set of commands has been taken into account.

8. A mobile radiocommunications terminal of the type designed to be controlled by a subscriber identity module with which it co-operates, said terminal including:

receive means for receiving a set of commands comprising at least one downloading command in which items from said predetermined list of items are distributed; said commands being organized to be transmitted successively when said set comprises at least two downloading commands; each downloading command containing an end-of-downloading mark that takes either a first valve or a second value depending on whether or not said downloading command is the only or last command in said set of commands; and execution means for executing each downloading command in said set of commands, so that, as a function of the value of said end-of-downloading mark, said terminal knows whether all of the items in said list have been transmitted by said subscriber identity module.

9. A terminal according to claim 8, further including transmit means for transmitting a message to said subscriber identity module confirming that each downloading command from said set of commands has been taken into account.

* * * * *